Jan. 9, 1940.   C. I. ERICKSON   2,186,911
AUTOMOBILE LIGHTING SYSTEM AND CONTROL SWITCH FOR THE SAME
Filed May 12, 1937   3 Sheets-Sheet 2

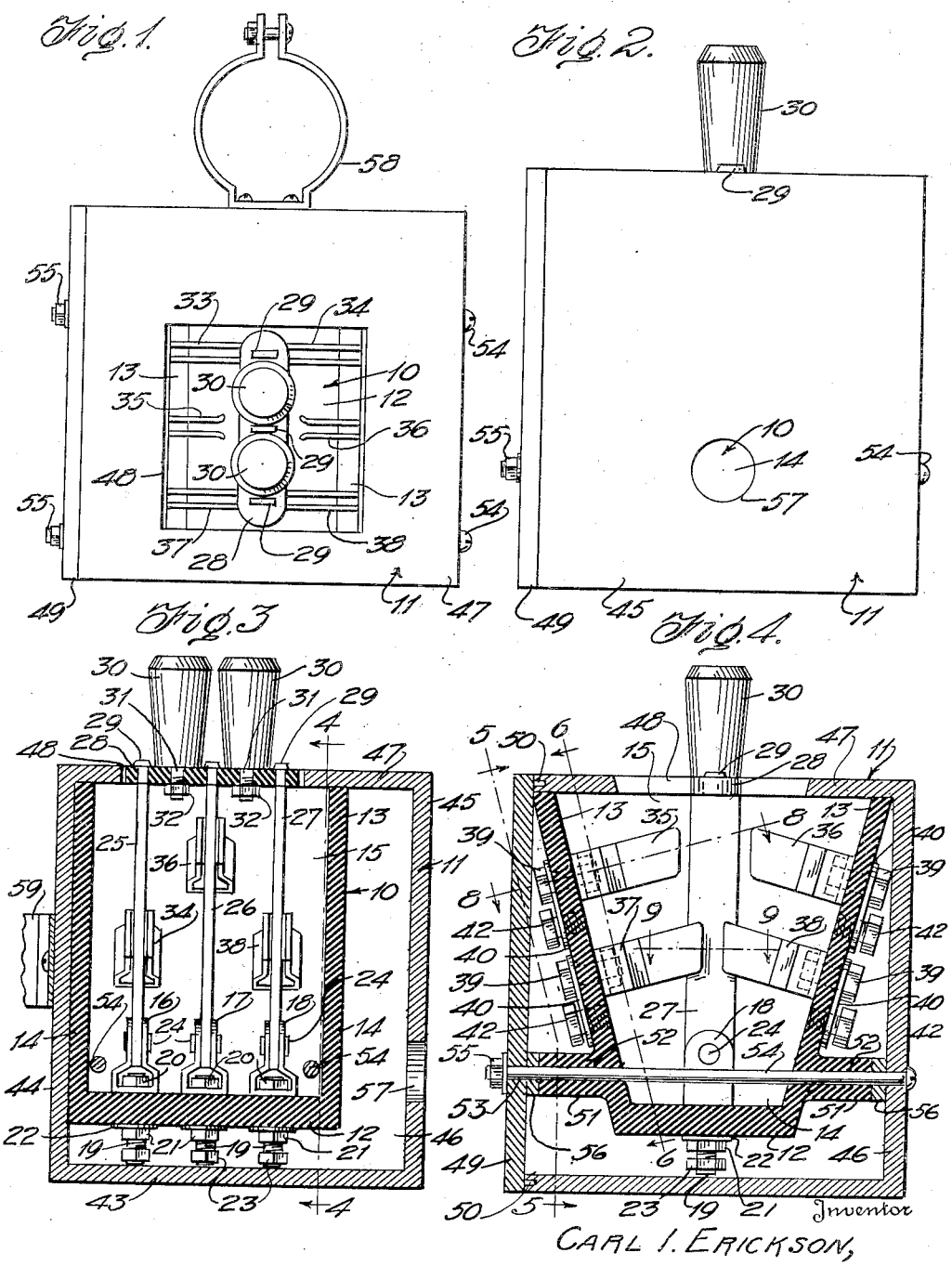

Inventor
CARL I. ERICKSON,
By Kimmel & Crowell,
Attorneys.

Patented Jan. 9, 1940

2,186,911

UNITED STATES PATENT OFFICE 2,186,911

AUTOMOBILE LIGHTING SYSTEM AND CONTROL SWITCH FOR THE SAME

Carl I. Erickson, Glendale, Ariz.

Application May 12, 1937, Serial No. 142,250

3 Claims. (Cl. 177—337)

This invention relates to automobile lighting systems and control switches for such systems.

One important object of the invention is to provide a novel lighting system of the kind herein-after described wherein signals for right and left turning of an automobile are given by the flashing of certain filaments of the ordinary lights of an automobile.

A second important object of the invention is to provide a novel lighting system of the kind herein set forth whereby the dim light filaments of the right and left headlights of an automobile are selectively flashed to indicate right and left turns of the vehicle respectively.

A third important object of the invention is to provide an improved system of this kind wherein the right head and tail lights or the left head and tail lights of an automobile are caused to flash simultaneously to indicate right and left turns of the vehicle respectively.

A fourth important object of the invention is to provide an improved system of this character wherein the dim lights of an automobile are flashed and wherein, in the event of failure of the dim lights the bright lights of the vehicle may be caused to flash for signal purposes as substitutes for the dim lights ordinarily to be used.

A fifth important object of the invention wherein a novel switch or circuit closer of the character hereinafter fully explained whereby both the closing of the usual lighting circuits and the control of the flasher circuits is used in a flasher signal system for automobile signals.

With the above and other objects in view, the invention consists in general of certain novel circuits, combinations of elements and arrangements of details hereinafter fully described, illustrated in the accompanying drawings and particularly pointed out in the appended claims.

In the accompanying drawings like characters of reference indicate like parts in the several views, and—

Figure 1 is a plan view of the switch device used herein and forming part of this invention.

Figure 2 is a front elevation of this switch means.

Figure 3 is a section taken substantially on the vertical median planes of Figures 1 and 2.

Figure 4 is a section on the line 4—4 of Figure 3.

Figure 10:
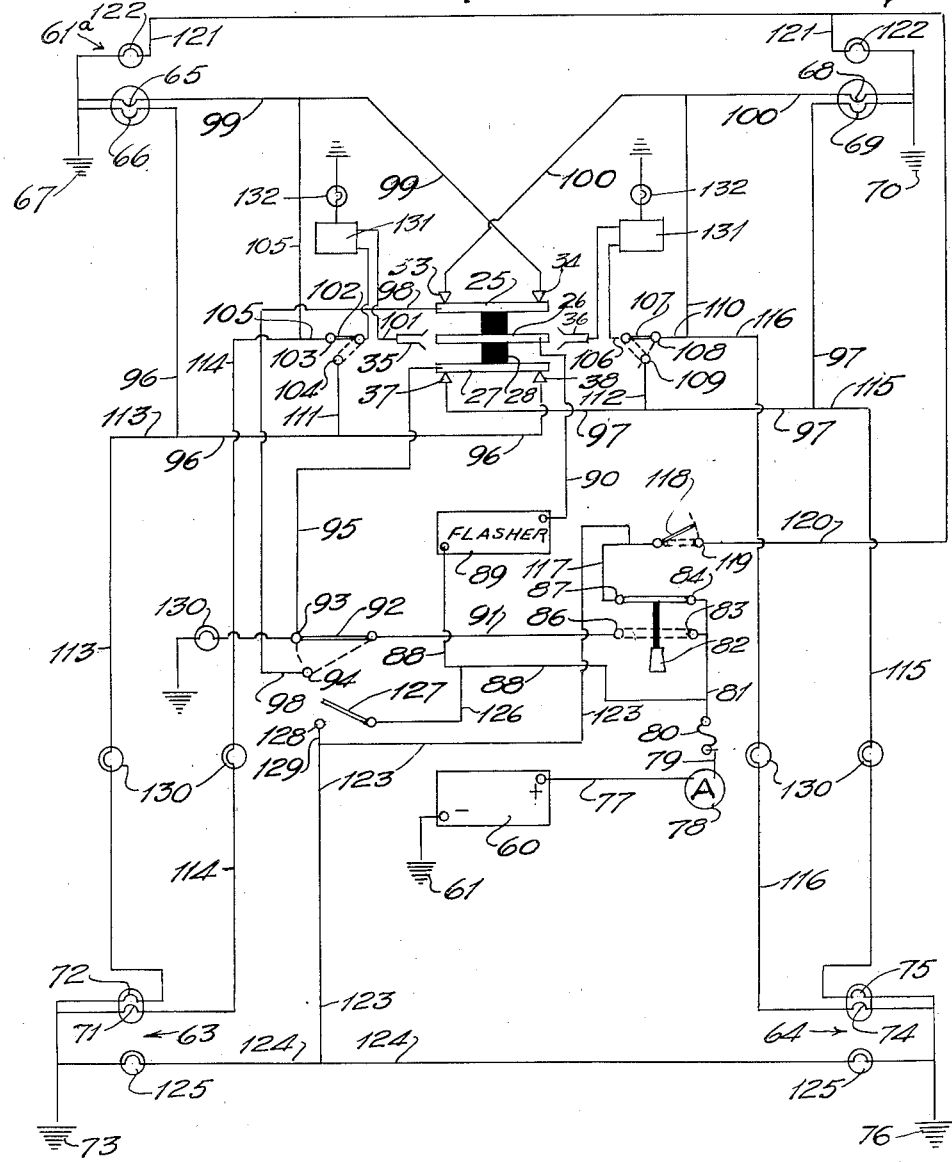
Figure 10 is a wiring diagram showing the circuit connections for the lighting system of this invention.

The switch used in this invention is shown in Figures 1 to 9 in complete mechanical construction and in Figure 10 in diagram. As shown especially in Figures 1 to 9 this switch is provided with an inner casing 10 of suitable insulating material and an outer casing 11 which may be of any preferred material, insulating or otherwise. The inner casing is preferably molded from a single block of insulating material and includes a rectangular bottom 12 from which extends upwardly a pair of side walls 13 which are flaringly disposed so that they are further apart at the top of the casing than at the bottom thereof. Also the inner casing 10 has parallel end walls 14 which, with the side and bottom walls, provide a bluntly wedge shaped space 15 within the casing.

Seated on the bottom 12 are three bearing yokes 16, 17 and 18. Bolts 19 extend through the bottom 12 and through the bottoms of the yokes. Within the yokes nuts 20 are fitted on the upper ends of the bolts 19 and beneath the bottom 12 these bolts are provided with nuts 21 and washers 22. By means of these bolts and nuts the yokes are firmly attached to the bottom 12. Also the bolts 19 carry nuts 23 which cooperate with the nuts 21 to constitute clamps or binding posts of circuit terminals. Each of the yokes 16, 17 and 18 is provided with a pivot pin 24 and on these pins between the yoke arms are pivoted the lower ends of blades 25, 26, and 27. The upper ends of the blades are laterally shouldered and pass through a tie bar 28 of insulating material, the extremities of the blades being upset as at 29 to hold the tie bar in place. One or more handles 30 are secured to the bar 28 by bolts 31 and nuts 32. It will be observed that the yokes 16, 17 and 18 are spaced along the median line of the bottom 12 so that they are equidistant from the sides 13,. Thus the blades may be swung from the central position shown in Figure 4 towards one side 13 or the other.

Figure 5:
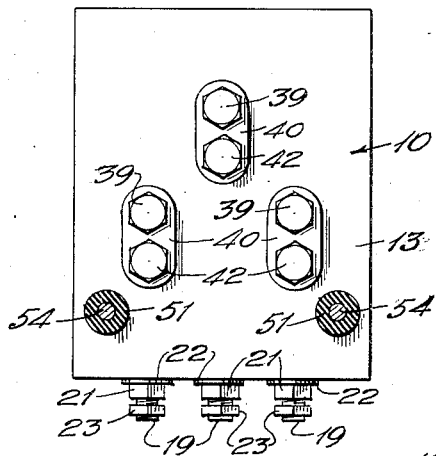
Figure 5 is a section on the line 5—5 of Figure 4 with the outer casing omitted.
Figure 6:
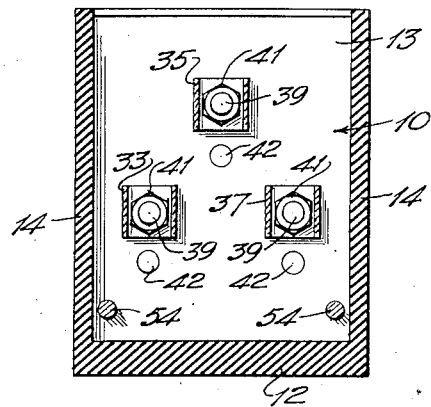
Figure 6 is a section on the line 6—6 of Figure 4 with the outer casing omitted.
Figure 7:
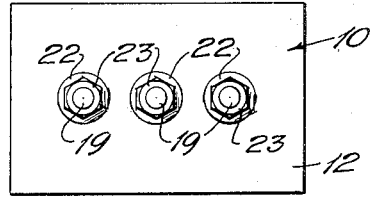
Figure 7 is an inverted plan view of the bottom of the inner and insulating casing.
Figure 8:
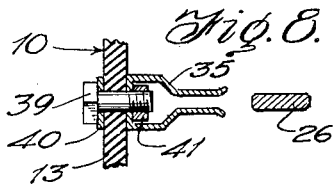
Figure 8 is a fragmentary section on the line 8—8 of Figure 4.
Figure 9:
Figure 9 is a fragmentary section on the line 9—9 of Figure 4.

Mounted on the inner faces of the sides 13 are oppositely disposed clip yokes 33 and 34, a second pair of oppositely disposed clip yokes 35 and 36 and a third pair of oppositely disposed clip yokes 37 and 38. The clips 33 and 34 are disposed to engage the blade 25 and are sufficiently close to be spanned by the blade in normal position as in Figure 4. Similarly, the clips 37 and 38 are disposed to receive and span the blade 27. The clips 35 and 36 are disposed to engage the blade 26 upon swinging of the blades out of the normal position of Figure 4 but do not normally engage the blade 25. It is further to be noted that when the blade 26 engages the clip 35, the blades 25 and 27 will disengage from the clips 34 and 38 and when the blade 26 engages the clip 36, the other blades will disengage from the clips, 33 and 37. Each of these clips is held to the casing by means of a bolt 39 passing through an elongated washer 40 and the base of the clip to engage a nut 41 held between the clip arms as best seen in Figures 5, 6 and 8. Binding screws 42 pass through the washers 40 and serve to connect circuit terminals through the washers 40 and bolts 39 to the contact clips. In Figure 10 these clips are indicated conventionally as contacts.

The outer casing 11 encloses the inner casing and consists of a bottom 43 from which extends an end wall 44 which engages against the outer face of one end wall 14, the bottom 43 being spaced below the bottom 12 to accommodate the bottom binding posts 19. The bottom 43 is longer than the bottom 12 and thus projects beyond the other end 14. A second end wall 45 extends upwardly from 43 in spaced parallel relation to the last mentioned end 14. A vertical side 46 extends upwardly from one side edge of the bottom and is fixed to the bottom. The end walls 44 and 45 extend upwardly to the top edges of the inner casing walls and the top of one wall 13 rests against the top of the wall 46. Covering the inner casing is a top 47 having an opening 48 formed therein to permit passage of the handles 30 and permit them to be swung to bring the blade 26 into selective engagement with the clips 35 and 36. There is thus provided an open sided outer casing and the open side is closed by a side member 49 positioned to close the open side by any suitable means such as the dowel pins 50. In order to hold the side member 49 in place and the inner casing in fixed position in the outer casing the following means is provided. The inner casing 10 is provided near its bottom with pairs of aligned bosses 51 projecting from the walls 13 and through these bosses and their supporting walls bolt holes 52 are provided which align with corresponding bolt holes 53 formed in the walls 46 and 49. Bolts 54 extend through the bolt holes 52 and 53 and are provided with nuts 55 and with spacers 56 which may be integral with the sides 46 and 49 or separate therefrom. Thus, when the nuts 55 are screwed up the parts are firmly held together. An opening 57 is provided in the wall 45 for connecting wires. A clip ring 58 may be secured to the wall 45 as in Figure 1 to support the switch on a steering column or a clip or connector as indicated at 59 in Figure 3 may be attached to the wall 44 for like purpose, the location of the clip depending on the desired location for the cable opening 57.

The circuit connections for this switch are illustrated in Figure 10 wherein the ordinary automobile storage battery is indicated at 60. The negative terminal of this battery is grounded as usual at 61. The lighting system includes the left headlight 61a, the right headlight 62, the left rear lights 63 and the right rear lights 64. The left headlight is shown as provided with a two filament lamp having a dim light filament 65 and a bright light filament 66 each of which has one terminal grounded as at 67. The right headlight similarly has a lamp provided with a dim light filament 68 and a bright light filament 69 which each have one terminal grounded at 70. At the left rear lamps 63 is a lamp having a dim light filament 71 and a bright light filament 72 each having one terminal grounded at 73. The right rear arrangement has a lamp provided with a dim light filament 74 and a bright light filament 75 each having one terminal grounded as at 76. The battery 60 has its positive terminal connected by a wire 77 to one terminal of an ammeter 78 which has its other terminal connected by a wire 79 to one terminal of a fuse 80. The other terminal of the fuse is connected by a wire 81 to a dash switch 82 having contacts 83 and 84 connected in multiple to the wire 81 and arranged to close circuits to contacts 86 and 87. The wire 81 is connected by a wire 88 with one terminal of a flasher 89 of any well known construction. The other terminal of the flasher 89 is connected by a wire 90 with the blade 26 through its binding post. The contact 86 is connected by a wire 91 with a switch having a movable contact 92 and a pair of fixed contacts 93 and 94, the contact 92 being normally closed on the contact 93 but movable to engage the contact 94. The contact 93 is connected by a wire 95 with the blade 27 through its binding post. The contact 38 is connected by a wire 96 with the filament 66 and the contact 37 is connected by a wire 97 with the filament 69. The contact 94 is connected by a wire 98 with the blade 25 through its binding post. The contact 34 is connected by a wire 99 with the filament 65 and the contact 33 is connected by a wire 100 with the filament 68. The contact 35 is connected by a wire 101 to the movable contact 102 of a switch having a pair of fixed contacts 103 and 104 on the former of which the contact 102 is normally closed. The contact 103 is connected by a wire 105 with the wire 99. The contact 36 is connected by a wire 106 with the movable contact 107 of a switch having a pair of fixed contacts 108 and 109 with the former of which the contact 107 is normally closed. The contact 108 is connected by a wire 110 with the wire 100. The contact 104 is connected by a wire 111 with the wire 96 and the contact 109 is connected by a wire 112 with the wire 97. The wire 96 is connected at a point between the connection of wire 111 and filament 66 by a wire 113 with filament 72. The wire 105 is connected by a wire 114 with the filament 71. The wire 97 is connected between the connection of wire 112 and filament 69 by a wire 115 with the filament 75. The wire 110 is connected by a wire 116 with filament 75. The contact 87 is connected by a wire 117 with the movable contact 118 of a normally open parking light switch having a fixed contact 119 with which the contact 118 may engage. A wire 120 leads from the contact 119 and has branches 121 leading to the respective right and left front parking lights 122. A wire 123 leads from the wire 117 and is provided with branches 124 leading to rear parking lights 125. The front parking lights are grounded at 67 and 70 and the rear parking lights are grounded at 73 and 76 respectively. A branch wire 126 leads from the wire 88 to the movable contact 127 of a stop switch having a fixed contact 128 which is connected by a wire 129 with the wire 123. Pilot lights 130 are interposed in wires 113, 114, 115 and 116. Relays 131 are connected in the wires 101 and 106 to close circuits through pilot light 132, these relays being of ordinary construction.

The several circuits occurring under varying conditions of operation will now be traced, the dash switch being in one of its closed positions corresponding to the circuit to be closed. With the special switch above described having its blades in central or normal position and the contact 92 engaging contact 93 current will flow from the battery 60 through wire 77, ammeter 78, wire 79, fuse 80, wire 81, contact 83, contact 86, wire 91, contact 92, contact 93, wire 95, blade 27 and from there through contact 37, wire 97, filament 69 and ground 70 back to the battery through ground 61. Also current will flow from wire 97 through wire 115, filament 75 and ground 76 back to the battery through ground 61. Under the same conditions current will flow from the blade 27 through contact 38, wire 96, filament 66, ground 67 and ground 61 back to the battery. Also current will flow from wire 96 through wire 113, filament 72, ground 73 and ground 61 back to the battery. It will be seen that under these conditions the bright light filaments 66, 69, 72 and 75 will all be connected in multiple to the battery 60. If the floor switch 92 be depressed to engage the contact 94 current will flow as under the first conditions to the contact 92 but will flow from there through the contact 94, wire 98, blade 25, contact 33, wire 100, filament 68, ground 70 and ground 61 back to the battery. Also current will flow from wire 100 through wire 110, wire 116, filament 74, ground 76 and ground 61 back to the battery. At the same time current will flow from the blade 25 through contact 34, wire 99, filament 65, ground 67 and ground 61 back to the battery. Also current will flow from wire 99, through wire 105, wire 114, filament 71, ground 73 and ground 61 back to the battery. Under these second conditions the dim light filaments 65, 68, 71 and 74 will be connected in multiple to the battery and the bright light filaments 66, 69, 72 and 75 will be disconnected.

With the contact or switch member 82 bridging contacts 83 and 86, the closing of switch or contact 127 will close a circuit to the parking lights through wires 81, 88, 126, contact 128, wires 129, 123 and branch wires 124. If it is desired at this time to also light parking lights 122, the switch or contact 118 is closed, the current flowing from switch 127, wires 129, 123, 117, 120 and branches 121.

From the foregoing it will be plain that with the special switch in its middle or normal position all the operations common to the ordinary operations of automobile lights can be performed in the usual manner and that this special arrangement of circuits does not interfere with such operation.

If it be desired to signal that the car is about to turn to the right the signal switch is moved to swing its blades 25, 26 and 27 to the right until the blade 26 engages contact 36 and blades 25 and 27 disengage from contacts 33 and 37. This will deenergize the wire 97 so that the filaments 69 and 75 will be deenergized. However, current will now flow through wire 88, flasher 89, wire 90, blade 26, contact 36, wire 106, contact 107, contact 108, wire 110, wire 100, filament 68, ground 70 and ground 61 back to the battery. Also current will flow from wire 110 through wire 116, filament 74, ground 76 and ground 61 back to the battery. Since this current flows through the flasher the dim filaments 68 and 74 on the right side of the vehicle will display a series of flashes. At the same time the bright light filaments on the left side of the car may remain energized or they may be dimmed by the action of the floor switch as before. In case either one or both filaments 68 and 74 burn out or break, the contact 107 may be shifted to engage contact 109 whereupon current will flow from contact 109 through wire 112 which will energize wire 97 so that, in the manner before described, filaments 69 and 75 will be energized but the current passing through the flasher will cause a series of bright flashes at these filaments. If a left turn is to be signaled the blades 25, 26 and 27 are shifted to the left until blade 26 engages the contact 35 and the blades 25 and 27 disengage from contacts 34 and 38 and thus open the circuits through filaments 66 and 72. Current will flow as before through the flasher to blade 26 and from there through contact 35, wire 101, contact 102, contact 103, wire 105, wire 99, filament 65, ground 67 and back through ground 61 to the battery. Current will also flow from wire 105 through wire 114, filament 71, ground 73 and ground 61 back to the battery. This will cause flashing of the dim lights at the front and rear of the vehicle. As before, moving the contact 102 to engage contact 104 will cut out the dim lights and energize the wire 96 through wire 111 so that the filaments 66 and 72 will be flashed.

What is claimed is:

1. In a lighting system for vehicles, right and left headlights each having a bright light filament and a dim light filament, right and left rear lamps each having a running light filament and a signal light filament, a battery, circuit connections between the battery and lamps including a switch normally connecting the bright light and running light filaments in multiple to the battery, said switch being movable to open the circuits of the right and left bright and running light filaments selectively, a flasher in series with said battery, flasher circuit connections between said flasher and the right dim and signal light filaments and between the flasher and the left dim and signal light filaments, said circuit connections between the filaments and flasher including a single pole double throw switch movable with the first switch and selectively closing the right and left flasher circuits upon opening of the left and right circuits first mentioned, and means for selectively connecting the right and left flasher circuits to the right and left bright and running light filaments.

2. In a lighting system for vehicles, right and left headlights each having a bright light filament and a dim light filament, right and left rear lamps each having a running light filament and a signal light filament, a battery, circuit connections between the battery and lamps and including a switch normally connecting the bright light and running light filaments in multiple to the battery, said switch being movable to open the circuits of the right and left bright and running light filaments selectively, a flasher in series with said battery, flasher circuit connections between said flasher and the right dim and signal light filaments and between the flasher and the left dim and signal light filaments, said circuit connections between the filaments and flasher including a single pole double throw switch movable with the first switch and selectively closing the right and left flasher circuits upon opening of the left and right circuits first mentioned, and means for selectively connecting the right and left flasher circuits to the right and left bright and running light filaments, said means including a pair of branch connections each including a normally open switch, one of said branch connections leading from the left connection of the flasher switch to the circuit connections to the left bright and running light filaments and the other branch connection leading from the right connection of the flasher switch to the circuit connections to the right bright and running light filaments.

3. In a lighting system for vehicles, right and left headlights each having a bright light filament and a dim light filament, right and left rear lamps each having a running light filament and a signal light filament, a battery, circuit connections between the battery and lamps and including a switch normally connecting the bright light and running light filaments in multiple to the battery, said switch being movable to open the circuits of the right and left bright and running light filaments selectively, a flasher in series with said battery, flasher circuit connections between said flasher and the right dim and signal light filaments and between the flasher and the left dim and signal light filaments, said circuit connections between the filaments and flasher including a single pole double throw switch movable with the first switch and selectively closing the right and left flasher circuits upon opening of the left and right circuits first mentioned, means for selectively connecting the right and left flasher circuits to the right and left bright and running light filaments, and switch means controllable by an operator movable to open the circuit from the battery to the bright and running light filaments and to close a circuit direct from the battery to the dim and signal light filaments.

CARL I. ERICKSON.